(12) United States Patent
Morini et al.

(10) Patent No.: US 6,294,497 B1
(45) Date of Patent: Sep. 25, 2001

(54) COMPONENTS AND CATALYSTS FOR THE POLYMERIZATION OF OLEFINS

(75) Inventors: Giampiero Morini, Padua; Giulio Balbontin; John Chadwick, both of Ferrara; Antonio Cristofori, S.M. Maddalena; Enrico Albizzati, Arona, all of (IT)

(73) Assignee: Montell Technology Company bv (NL)

( * ) Notice: Subject to any disclaimer, the term of this patent is extended or adjusted under 35 U.S.C. 154(b) by 0 days.

(21) Appl. No.: 09/094,049

(22) Filed: Jun. 9, 1998

(30) Foreign Application Priority Data

Jun. 9, 1997 (IT) .............................................. MI97A1350

(51) Int. Cl.$^7$ .................................................... B01J 31/00
(52) U.S. Cl. ......................... 502/127; 502/102; 502/103; 502/118; 502/125; 502/126
(58) Field of Search .................................... 502/102, 103, 502/118, 125, 126, 127

(56) References Cited

U.S. PATENT DOCUMENTS

| | | |
|---|---|---|
| 4,220,554 | 9/1980 | Scata et al. . |
| 4,298,718 | 11/1981 | Mayr et al. . |
| 4,399,054 | 8/1983 | Ferraris et al. . |
| 4,495,338 | 1/1985 | Mayr et al. . |
| 5,081,087 | 1/1992 | Villena et al. . |
| 5,703,181 | * 12/1997 | Tashiro et al. ........................ 526/140 |
| 5,731,393 | * 3/1998 | Kojoh et al. ....................... 526/124.8 |
| 5,854,165 | * 12/1998 | Yabunouchi et al. ................. 502/117 |

FOREIGN PATENT DOCUMENTS

| | | |
|---|---|---|
| 045 977 A2 | of 1982 | (EP) . |
| 086 473 A2 | of 1983 | (EP) . |
| 086 644 A2 | of 1983 | (EP) . |
| 125 911 B1 | of 1984 | (EP) . |
| 395 083 A2 | of 1990 | (EP) . |
| 553 805 A1 | of 1993 | (EP) . |
| 553 806 A1 | of 1993 | (EP) . |

OTHER PUBLICATIONS

English translation of JP 08–157521 no date available.

* cited by examiner

Primary Examiner—Elizabeth D. Wood
(74) Attorney, Agent, or Firm—Bryan Cave LLP

(57) ABSTRACT

The present invention relates to a solid catalyst component for the polymerization of olefins $CH_2=CHR$ in which R is hydrogen or a hydrocarbyl radical with 1–12 carbon atoms, comprising a titanium compound, having at least a Ti-halogen bond and an electron donor compound supported on a Mg halide, in which said electron donor compound is selected from esters of malonic acids of formula (I):

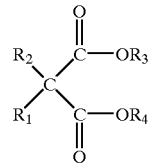

wherein $R_1$ is H or a $C_1$–$C_{20}$ linear or branched alkyl, alkenyl, cycloalkyl, aryl, arylalkyl or alkylaryl group; $R_2$ is a $C_1$–$C_{20}$ linear or branched alkyl, alkenyl, cycloalkyl, aryl, arylalkyl or alkylaryl group; $R_3$ and $R_4$ the same or different are $C_4$–$C_{20}$ linear or branched alkyl, alkylcycloalkyl, primary arylalkyl or primary alkylaryl. Said catalyst components when used in the polymerization of olefins, and in particular of propylene, are capable to give high yields and polymers having high insolubility in xylene.

29 Claims, No Drawings

COMPONENTS AND CATALYSTS FOR THE POLYMERIZATION OF OLEFINS

The present invention relates to catalyst components for the polymerization of olefins, to the catalyst obtained therefrom and to the use of said catalysts in the polymerization of olefins $CH_2=CHR$ in which R is hydrogen or a hydrocarbyl radical with 1–12 carbon atoms. In particular the present invention relates to catalyst components, suitable for the stereospecific polymerization of olefins, comprising a titanium compound having at least a Ti-halogen bond and an electron donor compound selected from esters of malonic acid having a particular formula supported on a Mg halide. Said catalyst components when used in the polymerization of olefins, and in particular of propylene, are capable to give polymers in high yields and with high isotactic index expressed in terms of high xylene insolubility.

The use of some esters of malonic acid as internal electron donors in catalysts for the polymerization of propylene is already known in the art.

In EP-A45977 is disclosed the use of an ester of the malonic acid (diethyl diisobutylmalonate) as internal donor of a catalyst for the polymerization of olefins. EP-A-5,86473 discloses a catalyst for the polymerization of olefins comprising (a) an alkyl compound, (b) an electron donor compound having certain reactivity features towards $MgCl_2$ and (c) a solid catalyst component comprising, supported on $MgCl_2$, a Ti halide and an electron donor selected from many classes of ester compounds including malonates. In particular, the use of diethyl allylmalonate and di-n-butyl malonate as internal donors in a catalyst for the polymerization of propylene is exemplified. From EP-A-86644 is known the use of diethyl n-butyl malonate and diethyl isopropylmalonate as internal donors in Mg-supported catalysts for the polymerization of propylene in which the external donor is a heterocyclic compound or a ketone. The European patent EP-B-125911 discloses a process for producing (co)polymers which comprises (co)polymerizing at least one olefin, optionally with a diolefin, in the presence of a catalyst composed of (a) a solid catalyst component containing Mg, Ti and an electron donor compound selected from esters of polycarboxylic acids, (b) an organometallic compound of a metal selected from group I to III of the periodic table, and (c) an organosilicon compound having a Si—O—C or a Si—N—C bond. Examples of preferred ester compounds include diethyl methylmalonate, diethyl butylmalonate, diethyl phenylmalonate, diethyl diethylmalonate, and diethyl dibutylmalonate. Only the use of a catalyst containing diethyl phenylmalonate has been exemplified in the preparation of polypropylene.

However, a common drawback experienced in the use of the above mentioned malonates was represented by a poor polymerization yield and/or a not suitable isotactic index of the final polymer.

JP-08157521 relates to a process for preparing a solid catalyst component for polymerization of olefins which is characterized by contacting a solid catalyst component produced by the reaction among a magnesium compound, a titanium compound and an halogen compound, with one or more electron donating compounds represented by the general formula:

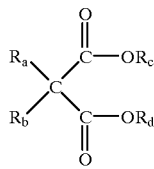

wherein $R_c$ and $R_d$ are, the same or different, a straight-chain or branched-chain hydrocarbon group having 1–10 carbon atoms, and $R_a$ and $R_b$ are the same or different, a saturated or cyclic saturated hydrocarbon group containing one or more secondary or tertiary carbons and having 3–20 carbon atoms.

Said patent application does not provide any indication regarding the effect of the substituents $R_c$ and $R_d$ upon the yield of the catalyst in the polymerization process. In particular, the use of specific electron donor compounds of formula (I) in which Rc and Rd are hydrocarbon groups having more than 3 carbon atoms is neither mentioned nor exemplified.

It has now surprisingly been found that if specific esters of malonic acid are used as internal donor, catalyst components capable to give an excellent balance between polymerization yield and isotactic index of the polymer are obtained.

It is therefore an object of the present invention to provide a solid catalyst component for the polymerization of olefins $CH_2=CHR$ in which R is hydrogen or a hydrocarbyl radical with 1–12 carbon atoms, comprising a titanium compound, having at least a Ti-halogen bond, and an electron donor compound supported on a Mg halide, in which said electron donor is selected from esters of malonic acids of formula (I):

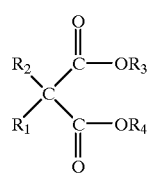

(I)

wherein $R_1$ is H or a $C_1$–$C_{20}$ linear or branched alkyl, alkenyl, cycloalkyl, aryl, arylalkyl or alkylaryl group; $R_2$ is a $C_1$–$C_{20}$ linear or branched alkyl, alkenyl, cycloalkyl, aryl, arylalkyl or alkylaryl group; $R_3$ and $R_4$ are independently selected from $C_4$–$C_{20}$ linear or branched alkyl, cycloalkyl, alkylcycloalkyl, primary arylalkyl or primary alkylaryl; preferably, they are primary branched $C_4$–$C_{20}$ alkyl groups such as isobutyl or neopentyl groups. When $R_1$ is H, $R_2$ is preferably a linear or branched $C_3$–$C_{20}$ alkyl, cycloalkyl, arylalkyl group; more preferably $R_2$ is a $C_3$–$C_{20}$ secondary alkyl, cycloalkyl, or arylalkyl group. Particularly preferred are also compounds of formula (I) in which $R_1$ is H and $R_2$ is a $C_5$–$C_{20}$ primary linear or branched alkyl, a $C_5$–$C_{20}$ cycloalkyl, a $C_7$–$C_{20}$ arylalkyl or alkylaryl group. Specific examples of preferred monosubstituted malonate compounds are di-n-butyl 2-isopropyl, diisobutyl 2-isopropyl, dineopentyl 2-isopropyl, dineopentyl 2-tetradecyl, di-n-butyl 2-decyl.

It has been found that the use of the electron donors of the formula (I) in the catalyst components according to the present invention results in higher yields and higher isotactic polymers with respect to those obtained by using the catalyst components containing the malonates of the prior art as internal donors.

The magnesium halide is preferably MgCl$_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are TiCl$_4$ and TiCl$_3$; furthermore, also Ti-haloalcoholates of formula Ti(OR)$_{n-y}$X$_y$, where n is the valence of titanium and y is a number between 1 and n, can be used.

The preparation of the solid catalyst component can be carried out according to several methods.

According to one of these methods, the magnesium dichloride in an anhydrous state, the titanium compound and the electron donor compound of formula (I) are milled together under conditions in which activation of the magnesium dichloride occurs. The so obtained product can be treated one or more times with an excess of TiCl$_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compound of formula (I) is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of TiCl$_4$ at a temperature of about 80 to 135° C. which contains, in'solution, an electron donor compound of formula (I). The treatment with TiCl$_4$ is repeated and the solid is washed with hexane in order to eliminate any non-reacted TiCl$_4$.

A further method comprises the reaction between magnesium alcoholates or chloroalcoholates (in particular chloroalcoholates prepared according to U.S. Pat. No. 4,220,554) and an excess of TiCl$_4$ containing the electron donor compound (I) in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$·pROH, where p is a number between 0,1 and 6 and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054. The so obtained adduct can be directly reacted with the Ti compound or it can be previously subjected to thermal controlled dealcoholation (80–130° C.) so as to obtain an adduct in which the number of moles of alcohol is generally lower than 2.5 preferably between 0,1 and 1,5. The reaction with the Ti compound can be carried out by suspending the adduct (dealcoholated or as such) in cold TiCl$_4$ (generally 0° C.); the mixture is heated up to 80–130° C. and kept at this temperature for 0,5–2 hours. The treatment with TiCl$_4$ can be carried out one or more times. The electron donor compound of formula (I) can be added during the treatment with TiCl$_4$. The treatment with the electron donor compound can be repeated one or more times.

The preparation of catalyst components in spherical form are described for example in European Patent Applications EP-A-395083, EP-A-553805, EP-A-553806.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0,2 cm$^3$/g preferably between 0,2 and 0,6 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with TiCl$_4$ in aromatic hydrocarbon solution can be repeated one or more times, and the electron donor compound of formula (I) is added during one or more of these treatments.

In any of these preparation methods the desired electron donor compound of formula (I) can be added as such or, in an alternative way, it can be obtained in situ by using an appropriate precursor capable to be transformed in the desired electron donor compound by means, for example, of known chemical reactions such as esterification, transesterification etc. Generally, the electron donor compound of formula (I) is used in molar ratio with respect to the MgCl$_2$ of from 00.1 to 1 preferably from 0,05 to 0,5.

The solid catalyst component according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1–12 carbon atoms, comprising the product of the reaction between:

(i) a solid catalyst component comprising a titanium compound having at least a Ti-halogen bond, and an electron donor compound supported on a Mg halide in active form, in which said electron donor compound is selected from esters of malonic acids of formula (I):

wherein R$_1$ is H or a C$_1$–C$_{20}$ linear or branched alkyl, alkenyl, cycloalkyl, aryl, arylalkyl or alkylaryl group; R$_2$ is a C$_1$–C$_{20}$ linear or branched alkyl, alkenyl, cycloalkyl, aryl, arylalkyl or alkylaryl group; R$_3$ and R$_4$ are independently selected from C$_4$–C$_{20}$ linear or branched alkyl, cycloalkyl, alkylcycloalkyl, primary arylalkyl or primary alkylaryl; preferably, they are primary branched $C_4$–$C_{20}$ alkyl groups such as isobutyl or neopentyl groups. When $R_1$ is H, $R_2$ is preferably a linear or branched $C_3$–$C_{20}$ alkyl, cycloalkyl, arylalkyl group; more preferably $R_2$ is a $C_3$–$C_{20}$ secondary alkyl, cycloalkyl, or arylalkyl group (ii) an alkylaluminum compound and, (iii) one or more electron-donor compounds (external donor).

The alkyl-Al compound (ii) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The external donor (iii) can be of the same type or it can be different from the internal donor of formula (I). Suitable external electron-donor compounds include the ethers, the esters, the amines, heterocyclic compounds and particularly 2,2,6,6-tetramethyl piperidine, the ketones and the 1,3-diethers of the general formula (II):

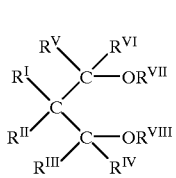

(II)

wherein $R^I$ and $R^{II}$, $R^{III}$, $R^{IV}$, $R^V$ and $R^{VI}$ equal or different to each other, hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle.

Particularly preferred are the external donors chosen among silicon compounds of formula $R^5_aR^6_bSi(OR^7)_c$, where a and b are integer from 0 to 2, c is an integer from 1 to 4 and the sum (a+b+c) is 4; $R^5$, $R^6$ and $R^7$ are alkyl, cycloalkyl or aryl radicals with 1–18 carbon atoms. Particularly preferred are silicon compounds in which a is 1, b is 1 and c is 2. Among the compounds of this preferred class, particularly preferred are the compounds in which $R_5$ and/or $R_6$ are branched alkyl, cycloalkyl or aryl groups with 3–10 carbon atoms and $R_7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3 and $R^6$ is a branched alkyl or cycloalkyl group and $R^7$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100. As previously indicated, when used in the (co)polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples hereblow reported, the use as internal electron donors of malonate compounds known in the art gives poor results in term of yields and/or xylene insolubility thereby showing a quite insufficient balance of properties.

Therefore, it constitutes a further object of the present invention a process for the (co)polymerization of olefins $CH_2=CHR$, in which R is hydrogen or a hydrocarbyl radical with 1–12 carbon atoms, carried out in the presence of a catalyst comprising the product of the reaction between:

(i) a solid catalyst component comprising a titanium compound having at least a Ti-halogen bond, and an electron donor compound supported on a Mg halide in active form, in which said electron donor compound is selected from esters of malonic acids of formula (I):

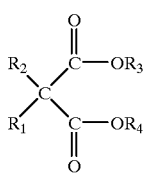

(I)

wherein $R_1$ is H or a $C_1$–$C_{20}$ linear or branched alky, alkenyl, cycloalkyl, aryl, arylalkyl or alkylaryl group; $R_2$ is a $C_1$–$C_{20}$ linear or branched alkyl alkenyl, cycloalkyl, aryl, arylalkyl or alkylaryl group; $R_3$ and $R_4$ the same or different are $C_4$–$C_{20}$ linear or branched alkyl alkylcycloalkyl, primary arylalkyl or primary alkylaryl preferably they are primary branched $C_4$–$C_{20}$ alkyl groups such as isobutyl or neopentyl groups. When $R_1$ is H, $R_2$ is preferably a linear or branched $C_3$–$C_{20}$ alky, cycloalkyl, arylalkyl group more preferably $R_2$ is a $C_3$–$C_{20}$ secondary alkyl, cycloalkyl, or arylalkyl group (ii) an alkylalurninum compound and, (iii) one or more electron-donor compounds (external donor).

Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0,5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

CHARACTERIZATIONS

The malonates of formula (I) used in the present invention can be prepared by transesterification of the correspondent diethyl malonates as described in Example 1 of DE 2822472. The diethyl malonates can be prepared according to known chemical synthesis as those described for example by J. March in "Advanced Organic Chemistry" IV Ed. (1992) pp. 464–468.

Propylene general polymerization procedure

In a 4 litre autoclave, purged with nitrogen flow at 70° C. for one hour, 80 ml of anhydrous hexane containing 10 mg of solid catalyst component, 7 mmoles of AlEt$_3$ and 0.35 mmoles of dicyclopentyldimethoxysilane were introduced in propylene flow at 30° C. The autoclave was closed, 3 NL of hydrogen were added and then, under stirring, 1.2 Kg of liquid propylene were fed. The temperature was raised to 70° C. in five minutes and the polymerization was carried out at this temperature for two hours. The unreacted propylene was removed, the polymer was recovered and dried at 70° C. under vacuum for three hours, and then it was weighed and fractionated with o-xylene to determine the amount of the xylene insoluble (X.I.) fraction at 25° C.

Determination of X.I 2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

EXAMPLES

Examples 1–4

Preparation of Solid Catalyst Components

Into a 500 ml four-necked round flask, purged with nitrogen, 225 ml of TiCl$_4$ were introduced at 0° C. While stirring, 10.3 g of microspheroidal MgCl$_2$. 2.1C$_2$H$_5$OH (obtained by partial thermal dealcoholation of an adduct prepared as described in Ex. 2 of U.S. Pat. No. 4,399,054 but operating at 3,000 rpm instead of 10,000) were added. The flask was heated to 40° C. and 9 mmoles of malonate were thereupon added. The temperature was raised to 100° C. and maintained for two hours, then the stirring was discontinued, the solid product was allowed to settle and the supernatant liquid was siphoned off.

200 ml of fresh TiCl$_4$ were added, the mixture was reacted at 120° C. for one hour and then the supernatant liquid was siphoned off. The solid was washed six times with anhydrous hexane (6×100 ml) at 60° C. and then dried under vacuum: the malonates used, the amount of Ti (wt %) and of malonates (wt %) contained in the solid catalyst component are reported in table 1. The polymerization results are reported in table 2.

COMPARATIVE EXAMPLES 5–7

Preparation of Solid Catalyst Component

The catalyst components have been prepared according to the same procedure of the examples 1–4 except for the fact that malonates different from those of formula (II) have been used. The malonates used, the amount of Ti (wt %) and of malonates (wt %) contained in the solid catalyst component are reported in table 1. The polymerization results are reported in table 2.

Example 8

Using the same equipment and the same type and amount of reagents described in example 3, a solid catalyst component was prepared with the difference that dineopentyl 2-isopropylmalonate (9 mmoles) was added during the second treatment with TiCl$_4$ and that a third treatment with 200 ml of fresh TiCl$_4$ was carried out at 120° C. for one hour.

The solid component contained: Ti=3.5 wt %, dineopentyl 2-isopropylmalonate=6.3 wt %, ethyl-neopentyl 2-isopropylmalonate=4.7 wt %, diethyl 2-isopropylmalonate=0.7 wt %.

The solid component was used to polymerize propylene with the procedure described above and the following results have been obtained:

Yield=41.1 KgPP/gCat;
X.I.=97.1 %

COMPARATIVE EXAMPLE 9

Example 8 was repeated using diethyl-2-isopropylmalonate instead of dineopentyl-2-isopropylmalonate.

The solid component contained: Ti=3.2 wt. %, diethyl-2-isopropylmalonate=12.9 wt.%.

The solid component was used to polymerize propylene with the above described procedure and the following results have been obtained:

Yield=20.4 kgPP/gCat;
X.I.=96.8 %

Example 10

Using the same equipment and the same type and amount of reagents described in ex. 2, a solid catalyst component was prepared with the difference that diisobutyl 2-isopropylmalonate (9+9 mmoles) was added both in the first and in the second treatment with TiCl$_4$ and that a third treatment with 200 ml of fresh TiCl$_4$ was carried out at 120° C. for one hour.

The solid cormponent contained: Ti=3.1 wt %, diisobutyl 2-isopropylmalonate=3.3 wt %, ethyl-isobutyl 2-isopropylmalonate=6.6 wt %, diethyl 2-isopropylmalonate=3.1 wt %.

The solid component was used to polymerize propylene with the procedure described above and the following results have been obtained:

Yield=36.3 KgPP/gCat;
X.I=97.6 %

COMPARATIVE EXAMPLE 11

Example 10 was repeated using diethyl 2-isopropylmalonate instead of diisobutyl 2-isopropylmalonate.

The solid component contained: Ti=2.8 wt %, diethyl 2-isopropylmalonate=18.5 wt %.

The solid component was used to polymerize propylene with the procedure described above and the following results have been obtained:

Yield=19.2 KgPP/gCat;
X.I.=97.0%

Example 12

Into a 500 ml four-necked round flask, purged with nitrogen, 250 ml of o-xylene/TiCl$_4$ mixture (1/1 volume) were introduced at 0° C. While stirring, 10 g of magnesium di(3-methoxyphenoxide), obtained as described in ex. "f" of U.S. Pat. No. 5,081,087, were added. The flask was heated to 40° C. and 6.2 mmoles of dineopentyl 2-isopropylmalonate were added. The temperature was raised to 110° C. and maintained for one hour, then the stirring was discontinued, the solid product was allowed to settle and the supernatant liquid was siphoned off.

250 ml of fresh o-xylene/TiCl$_4$ mixture were added, the mixture was reacted at 110° C. for thirty minutes and then the supernatant liquid was siphoned off; this treatment was repeated again, then the solid was washed six times with anhydrous hexane (6×100 ml) at 60° C. and dried under vacuum.

The solid component contained: Ti=3.6 wt %, dineopentyl 2-isopropylmalonate=13.3 wt %.

The solid component was used to polymerize propylene with the procedure described above and the following results have been obtained:

Yield=44.5 KgPP/gCat;
X.I.=97.1 %.

As it can be seen from the above, the use of the malonates of the formula (I) in the catalyst components according to the present invention results in higher yields and higher isotactic polymers with respect to those obtained by using the catalyst components containing the malonates of the prior art. In fact, when comparing the influence of $R_3$ and $R_4$ on the polymerization yields, it is possible to note that passing from diethyl-2-isopropylmalonate (comparative example 6) to di-n-butyl-2-isopropylmalonate (example 1), the yields increase from 22.5 kgPP/gCat to 40.7 kgPP/gCat. Surprisingly, this result is only achieved when there is at least one substituent in the 2 position of the malonate ($R_2$ is different from hydrogen) and a $R_3$ and $R_4$ are as above defined. This is confrmned by the fact that the polymerization yields obtained by passing from diethylmalonate (comparative example 5) to di-n-butylmalonate (comparative example 4) are comparable (13.1 kgPP/gCat versus 11.9 kgPP/gCat). It is therefore important that at least $R_2$ is different from H.

TABLE 1

| Solid catalyst component preparation | | Solid catalyst component composition | | |
|---|---|---|---|---|
| Ex. n. | Malonate type | Ti wt % | type | Malonate wt % |
| 1 | di-n-butyl 2-isopropyl | 3.6 | di-n-butyl 2-isopropyl | 1.2 |
| | | | n-butyl-ethyl 2-isopropyl | 3.9 |
| | | | diethyl 2-isopropyl | 4.7 |
| 2 | diisobutyl 2-isopropyl | 3.7 | diisobutyl 2-isopropyl | 1.3 |
| | | | isobutyl-ethyl 2-isopropyl | 4.8 |
| | | | diethyl 2-isopropyl | 3.5 |
| 3 | dineopentyl 2-isopropyl | 3.7 | dineopentyl 2-isopropyl | 3.5 |
| | | | neopentyl-ethyl 2-isopropyl | 6.4 |
| | | | diethyl 2-isopropyl | 1.1 |
| 4 | dineopentyl-2-methyl | 3.6 | dineopentyl 2-methyl | 0.8 |
| | | | neopentyl-ethyl 2-methyl | 7.6 |
| | | | diethyl 2-methyl | 3.0 |
| comp. 5 | di-n-butyl | 2.4 | di-n-butyl | 2.0 |
| | | | n-butyl-ethyl | 6.2 |
| | | | diethyl | 5.6 |
| comp. 6 | diethyl | 3.3 | diethyl | 10.8 |
| comp. 7 | diethyl 2-isopropyl | 3.1 | diethyl 2-isopropyl | 11.2 |

TABLE 2

| Example | Yield KgPP/gCat | X.I. % |
|---|---|---|
| 1 | 40.7 | 96.7 |
| 2 | 43.5 | 97.0 |
| 3 | 50.0 | 96.9 |

TABLE 2-continued

| Example | Yield KgPP/gCat | X.I. % |
|---|---|---|
| 4 | 31.2 | 96.2 |
| comp. 5 | 11.9 | 92.6 |
| comp. 6 | 13.1 | 92.0 |
| comp. 7 | 22.5 | 96.5 |

What is claimed is:

1. A solid catalyst component for the polymerization of olefins $CH_2=CHR$ in which R is hydrogen or a hydrocarbyl radical with 1–12 carbon atoms, comprising a titanium compound, having at least a Ti-halogen bond and an electron donor compound supported on a Mg halide, in which said electron donor compound is selected from esters of malonic acids of formula (I):

wherein $R_1$ is H or a $C_1$–$C_{20}$ linear or branched alkyl, a $C_1$–$C_{20}$ alkenyl, a $C_3$–$C_{20}$ cycloalkyl, a $C_6$–$C_{20}$ aryl, a $C_7$–$C_{20}$ arylalkyl or a $C_7$–$C_{20}$ alkylaryl group; $R_2$ is a $C_1$–$C_{20}$ linear or branched alkyl, a $C_1$–$C_{20}$ alkenyl, a $C_3$–$C_{20}$ cycloalkyl, a $C_6$–$C_{20}$ aryl, a $C_7$–$C_{20}$ arylalkyl or a $C_7$–$C_{20}$ alkylaryl group; $R_3$ and $R_4$, the same or different are $C_4$–$C_{20}$ linear or branched alkyl, a $C_4$–$C_{20}$ alkylcycloaklyl, a $C_7$–$C_{20}$ primary arylalkyl or a $C_7$–$C_{20}$ primary alkylaryl group.

2. A solid catalyst component according to claim 1 in which $R_3$ and $R_4$ are branched $C_4$–$C_{20}$ alkyl groups.

3. A solid catalyst component according to claim 1 in which $R_1$ is H and $R_2$ is a linear or branched $C_3$–$C_{20}$ alkyl, $C_3$–$C_{20}$ cycloalkyl, or $C_7$–$C_{20}$ arylalkyl group.

4. A solid catalyst component according to claim 3 in which $R_2$ is a $C_3$–$C_{20}$ secondary alkyl, $C_3$–$C_{20}$ secondary cycloalkyl, or $C_7$–$C_{20}$ secondary arylalkyl group.

5. A solid catalyst component according to claim 1 in which $R_1$ is H and $R_2$ is a primary linear or branched $C_5$–$C_{20}$ alkyl, $C_5$–$C_{20}$ cycloalkyl, or $C_7$–$C_{20}$ arylalkyl group.

6. A solid catalyst component according to claim 1 in which the electron donor compound of formula (I) is a malonate selected from the group consisting of di-n-butyl 2-isopropyl malonate, diisobutyl 2-isopropyl malonate, dineopentyl 2 tetradecyl malonate, and di-n-butyl 2-decyl malonate.

7. A solid catalyst component according to claim 1 in which the magnesium halide is $MgCl_2$ in active form.

8. A solid catalyst component according to claim 1 having a spherical form, a surface area (by B.E.T. method) between 20 and 500 $m^2/g$ and a total porosity (by B.E.T. method) higher than 0.2 $cm^3/g$.

9. A catalyst for the polymerization of olefins $CH_2=CHR$, in which R is hydrogen or a hydrocarbyl radical with 1–12 carbon atoms, comprising the product of the reaction between:
 (i) the solid catalyst component of claim 1;
 (ii) an alkylaluminum compound and,
 (iii) one or more electron-donor compounds (external donor).

10. Catalyst according to claim 9 in which the alkylaluminum compound (ii) is a trialkyl aluminum compound.

11. Catalyst according to claim 10 which the trialkyl aluminum compound is selected from the group consisting of triethylaluminum, triisobutylaluminum, tri-n-butylaluminum, tri-n-hexylaluminum, tri-n-octylaluminum.

12. Catalyst according to claim 9 in which the external donor (iii) is selected from 1,3-diethers of the general formula (II):

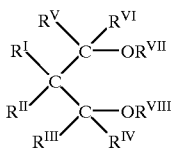
(II)

wherein R and $R^I$, $R^{II}$, $R^{III}$, $R^{IV}$, $R^V$ and $R^{VI}$, which are the same as or different from each other, are hydrogen or hydrocarbon radicals having from 1 to 18 carbon atoms, and $R^{VII}$ and $R^{VIII}$ are the same as or different from each other, have the same meaning as radicals $R^I$ to $R^{VI}$ except that they cannot be hydrogen; and one or more of the R–$R^{VIII}$ groups can be linked to form a cycle.

13. Catalyst according to claim 9 in which the external donor (iii) is a silicon compound of formula $aR^5bR^6Si(OR^7)c$, where a and b are integers from 0 to 2, c is an integer from 1 to 4 and the sum (a+b+c) is 4; $R^5$, $R^6$ and $R^7$ are alkyl, cycloalkyl or aryl radicals with 1–18 carbon atoms.

14. Catalyst according to claim 13 in which a is 1, b is 1 and c is 2.

15. Catalyst according to claim 14 in which $R_5$ and/or $R_6$ are branched alkyl, cycloalkyl or aryl groups with 3–10 carbon atoms and $R_7$ is a $C_1$–$C_{10}$ alkyl group.

16. Catalyst according to claim 13 which a is 0, c is 3 and $R^6$ is a branched alkyl or cycloal group and $R^7$ is methylc.

17. Catalyst according to claim 15 in which the silicon compound is selected from the group consisting of methylcyclohexyldimethoxysilane, diphenyldimethoxysilane, methyl-t-butyldimethoxysilane, dicyclopentyldimethoxysilane cyclohexyltrimethoxysilane, t-butyltrimethoxysilane and thexyltrimethoxysilane.

18. A solid catalyst component according to claim 8 having a surface area (by B.E.T. method) between 50 and 300 m²/g and a total porosity (by B.E.T. method) between 0.2 and 0.6 cm³/g.

19. A solid catalyst component for the polymerization of olefins $CH_2$=CHR in which R is hydrogen or a hydrocarbyl radical with 1–12 carbon atoms, comprising:

(i) a titanium compound selected from the group consisting of $TiCl_3$, $TiCl_4$, and titanium alcoholates of formula $Ti(OR)_{n-y}X_y$ (where n is the valence of the titanium, y is a number between 1 and n, and X is a halogen), and (ii) an electron donor compound, (iii) supported on a Mg halide, in which said electron donor compound is selected from esters of malonic acids of formula (I):

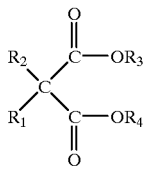
(I)

wherein $R_1$ is H or a $C_1$–$C_{20}$ linear or branched alkyl, a $C_1$–$C_{20}$ alkenyl, a $C_3$–$C_{20}$ cycloalkyl, a $C_6$–$C_{20}$ aryl, a $C_7$–$C_{20}$ arylalkyl or a $C_7$–$C_{20}$ alkylaryl group; $R_2$ is a $C_1$–$C_{20}$ linear or branched alkyl, $C_1$–$C_{20}$ alkenyl, a $C_3$–$C_{20}$ cycloalkyl, a $C_6$–$C_{20}$ aryl, a $C_7$–$C_{20}$ arylalkyl or a $C_7$–$C_{20}$ alkylaryl group; $R_3$ and $R_4$, the same or different are $C_4$–$C_{20}$ linear or branched alkyl, a $C_4$–$C_{20}$ alkylcycloaklyl, a $C_7$–$C_{20}$ primary arylalkyl or a $C_7$–$C_{20}$ primary alkylaryl group.

20. A solid catalyst component according to claim 19 in which $R_1$ is H and $R_3$ and $R_4$ are branched $C_4$–$C_{20}$ alkyl groups.

21. A solid catalyst component according to claim 19 in which $R_1$ is H and $R_2$ is a linear or branched $C_3$–$C_{20}$ alkyl, $C_3$–$C_{20}$ cycloalkyl, or $C_7$–$C_{20}$ arylalkyl group.

22. A solid catalyst component according to claim 21 in which $R_2$ is a $C_3$–$C_{20}$ secondary alkyl, $C_3$–$C_{20}$ secondary cycloalkyl, or $C_7$–$C_{20}$ secondary arylalkyl group.

23. A solid catalyst component according to claim 19 in which $R_1$ is H and $R_2$ is a primary linear or branched $C_5$–$C_{20}$ alkyl, $C_5$–$C_{20}$ cycloalkyl, or $C_7$–$C_{20}$ arylalkyl group.

24. A solid catalyst component according to claim 19 in which the electron donor compound of formula (I) is a malonate selected from the group consisting of di-n-butyl 2-isopropyl malonate, diisobutyl 2-isopropyl malonate, dineopentyl 2 tetradecyl malonate, and di-n-butyl 2 decyl malonate.

25. A solid catalyst component according to claim 19 in which the magnesium halide is $MgCl_2$ in active form.

26. A catalyst for the polymerization of olefins $CH_2$=CHR, in which R is hydrogen or a hydrocarbyl radical with 1–12 carbon atoms, comprising the product of the reaction between:

(i) the solid catalyst component of claim 19

(ii) an alkylaluminum compound, and (iii) one or more electron-donor compounds (external donor).

27. Catalyst according to claim 26 in which the alkylaluminum compound (ii) is a trialkyl compound.

28. Catalyst according to claim 26 in which the electron-donor compound (iii) is a silicon compound of formula $aR^5bR^6Si(OR^7)c$, where a and be are integers from 0 to 2, c is an integer from 0 to 2, c is an integer from 1 to 4 and the sum (a+b+c) is 4; $R^5$, $R^6$ and $R^7$ are alkyl, cycloalkyl or aryl radicals with 1–18 carbon atoms.

29. Catalyst according to claim 28 in which the silicon compound is selected from the group consisting of methylcyclohexanedimethoxysilane, dephenyldimethoxysilane, methyl-t-butyldimethoxysilane, dicyclopentyldimethoxysilane, cyclohexyltrimethoxysilane, t-butyltrimethoxysilane, and thexyltrimethoxysilane.

* * * * *

UNITED STATES PATENT AND TRADEMARK OFFICE
CERTIFICATE OF CORRECTION

PATENT NO. : 6,294,497 B1
DATED : September 25, 2001
INVENTOR(S) : Morini et al.

It is certified that error appears in the above-identified patent and that said Letters Patent is hereby corrected as shown below:

Column 12,
Line 49, change "be" to -- b --.
Lines 49-50, delete "c is an integer from 0 to 2,".

Signed and Sealed this

Twenty-third Day of April, 2002

Attest:

Attesting Officer

JAMES E. ROGAN
Director of the United States Patent and Trademark Office